(12) United States Patent
Mardirossian et al.

(10) Patent No.: US 7,486,428 B2
(45) Date of Patent: Feb. 3, 2009

(54) SYSTEM AND METHOD OF ADJUSTING VEHICLE WINDOW TRANSMISSION BASED ON HIGH BEAM DETECTION

(75) Inventors: Aris Mardirossian, Germantown, MD (US); William Fourney, Laurel, MD (US)

(73) Assignee: Technology Patents, LLC, Derwood, MD (US)

( * ) Notice: Subject to any disclaimer, the term of this patent is extended or adjusted under 35 U.S.C. 154(b) by 361 days.

(21) Appl. No.: 11/214,041

(22) Filed: Aug. 30, 2005

(65) Prior Publication Data

US 2007/0047089 A1    Mar. 1, 2007

(51) Int. Cl.
*G02F 1/15* (2006.01)
(52) U.S. Cl. .......................... 359/265; 345/7
(58) Field of Classification Search ................ 359/296; 345/7; 296/97.2
See application file for complete search history.

(56) References Cited

U.S. PATENT DOCUMENTS

| | | | |
|---|---|---|---|
| 6,002,511 A * | 12/1999 | Varaprasad et al. | ......... 359/265 |
| 6,056,410 A * | 5/2000 | Hoekstra et al. | ............ 359/603 |
| 6,567,708 B1 | 5/2003 | Bechtel et al. | |
| 6,597,489 B1 | 7/2003 | Guarr et al. | |
| 6,643,050 B2 | 11/2003 | Rukavina et al. | |
| 6,783,099 B2 | 8/2004 | Rukavina et al. | |
| 6,842,276 B2 | 1/2005 | Poll et al. | |
| 6,906,832 B2 | 6/2005 | Furukawa et al. | |
| 6,972,888 B2 * | 12/2005 | Poll et al. | .................... 359/265 |
| 2003/0169213 A1 * | 9/2003 | Spero | ............................ 345/7 |

* cited by examiner

*Primary Examiner*—Timothy J Thompson
(74) *Attorney, Agent, or Firm*—Nixon & Vanderhye P.C.

(57) ABSTRACT

A system and method for reducing vehicle window (e.g., windshield and/or backlite) visible light transmission when high beams are detected. In certain example embodiments, a detector detects the presence of a light source above certain luminescent threshold. A controller then reduces the visible light transmission of a windshield and/or backlite via an electrochromic process and/or by using electrodes to apply a voltage across a gas-filled chamber for example. The visible light transmission is restored when the controller determines that the light source detected has dropped below the threshold luminescence or has disappeared.

8 Claims, 5 Drawing Sheets

SYSTEM AND METHOD OF ADJUSTING VEHICLE WINDOW TRANSMISSION BASED ON HIGH BEAM DETECTION

FIELD OF THE INVENTION

This invention relates to a system and method for reducing visible light transmission of a vehicle window (e.g., windshield and/or backlite) when high beams are detected. In certain example embodiments, a system and/or method is provided for reducing visible light transmission via electrochromic means and/or by using electrodes to apply a voltage across a gas-filled chamber upon detection of high beams either in front of or behind the vehicle.

BACKGROUND AND SUMMARY OF EXAMPLE EMBODIMENTS OF THE INVENTION

Motorists often encounter dangerous situations when they travel at night. Too frequently, a motorist may be distracted or even temporarily blinded by the bright lights or high-beams of either an oncoming motorist and/or a motorist approaching from behind. The resulting reduced visibility endangers drivers on the road (including third-parties), bikers, and pedestrians, as well as property in the surrounding areas. Indeed, a blinded driver might swerve off the road. A blinded driver who slows down risks being "rear-ended," and a driver who speeds-up risks losing control of the automobile. Furthermore, the chance for an accident is increased because many drivers "retaliate" by turning on their own high beams when they see and are impaired by the high beams of oncoming traffic.

Similar peril exists when other sources of bright light reach the driver's eyes. Other sources might include, for example, spotlights, etc. Like the high-beam example above, a motorist may be blinded by light shining in through the front windshield or through the backlite.

A solution that involves merely tinting the windows may work in daytime situations, but potentially creates even greater hazards in the darkness. Tinting is problematic in that it is continuous and always present. A comprehensive solution must compensate for bright light emanating from a variety of light sources at various times of the day and night.

Thus, it will be appreciated that there exists a need in the art for a method and/or system for reducing visible light transmission of an automobile's front windshield and/or backlite (frequently called the rear window) selectively in response to a variety of situations relating to bright light, at least to help drivers avert accidents.

Therefore, certain example embodiments of this invention seek to reduce the chance of an accident that might ensue when a driver encounters reduced visibility or temporary blindness as a result of light above a certain luminescent threshold. Certain example embodiments of this invention employ a sensor that detects high beams and/or light above a certain threshold, and then reduces the visible light transmission of the front windshield and/or backlite accordingly upon detection of the same. The visible light transmission may be reduced, for example, by using a electrochromic element or by using electrodes to apply a voltage across a gas-filled chamber in the window.

In accordance with certain example embodiments of the present invention, a method is provided for adjusting the visible light transmission of a front windshield and/or backlite. This method may comprise the steps of detecting a light source and determining whether the light source exceeds a threshold luminescence. The visible light transmission of the front windshield and/or backlight is reduced if the light source exceeds the threshold luminescence. Otherwise, if the light source is no longer detected or no longer exceeds the threshold luminescence, the visible light transmission of the front windshield and/or backlight is restored.

In one example embodiment, the visible light transmission of the front windshield and/or backlight is reduced via an electrochromic process. In another example embodiment, the visible light transmission of the front windshield and/or backlight is reduced by using electrodes to apply a voltage across a gas-filled chamber.

In certain example embodiments, the visible light transmission is reduced by at least about 5%, more preferably by at least about 10%, and sometimes by at least about 20% upon detection of high beams and/or light above a predetermined threshold. In certain example embodiments, the visible light transmission of the window is at least 70% when high beams are not detected.

In accordance with another example embodiment of the present invention, a front windshield comprises first and second glass substrates, a low-emissivity (low-E) coating for reflecting radiant energy from the vehicle exterior, a polyvinyl butyral (PVB) layer for reducing the shattering of the first and second glass substrates and laminating the substrates to each other, and an electrochromic layer for adjusting the visible light transmission of the front windshield. Furthermore, a detector for detecting the luminescence of a light source is provided. An electrochromic controller is connected to the electrochromic layer to instruct the electrochromic layer whether and/or to what extent the visible light transmission should be reduced, based on a comparison between the luminescence of the detected light and a threshold value.

In accordance with another example embodiment of the present invention, a front windshield comprises first and second glass substrates, a low-E coating, a PVB layer, and a gas-filled area or gap for adjusting the visible light transmission of the front windshield. The gas-filled area may comprise first and second electrodes with a gap provided therebetween in which gas is housed. Furthermore, a detector for detecting the luminescence of a light source is provided. An electrode controller is connected to the first and second electrodes in the gas-filled area to instruct the first and second electrodes whether and/or to what extent a voltage should be applied across the gas-filled chamber to reduce the visible light transmission, based on a comparison between the luminescence of the detected light and a threshold value.

In accordance with another example embodiment of the present invention, a backlite comprises a glass substrate and an electrochromic layer for adjusting the visible light transmission of the backlite. Furthermore, a detector for detecting the luminescence of a light source is provided. An electrochromic controller is connected to the electrochromic layer to instruct the electrochromic layer whether and/or to what extent the visible light transmission should be reduced, based on a comparison between the luminescence of the detected light and a threshold value.

In accordance with another embodiment of the present invention, a backlite comprises first and second glass substrates with a gas-filled area or gap therebetween for adjusting the visible light transmission of the backlite. The gas-filled area can comprise first and second electrodes. Furthermore, a detector for detecting the luminescence of a light source is provided. An electrode controller is connected to the first and second electrodes in the gas-filled area or gap to instruct the first and second electrodes whether and/or to what extent a voltage should be applied across the gas-filled chamber to reduce the visible light transmission, based on a comparison between the luminescence of the detected light and a threshold value.

In other example embodiments of this invention, method of adjusting the visible light transmission of a vehicle window such as a windshield or backlite upon detection of high beams, the method comprising: detecting a light source; determining whether said light source exceeds a threshold luminescence; when it is determined that the light source exceeds the threshold luminescence, implementing a pulsed filtering system so that filter of light occurs on a pulsating basis to as to periodically filter out at least portions of predetermined wavelengths of light. In certain example instances, the pulsating of the filtering may be in the form of a square wave, a sine wave or the like.

In other example embodiments of this invention, there is provided a method of adjusting the visible light transmission of a vehicle window such as a windshield or backlite upon detection of high beams, the method comprising: detecting a light source; determining whether said light source exceeds a threshold luminescence; and using a filtering system to cause incoming high beam(s) from other vehicle(s) to appear as a low beam(s) light(s) when said light source exceeds said threshold luminescence.

BRIEF DESCRIPTION OF THE DRAWINGS

These and other features and advantages will be better and more completely understood by reference to the following detailed description of exemplary illustrative embodiments in conjunction with the drawings, of which.

DETAILED DESCRIPTION OF EXAMPLE EMBODIMENTS OF THE INVENTION

First Embodiment

Figure 1:
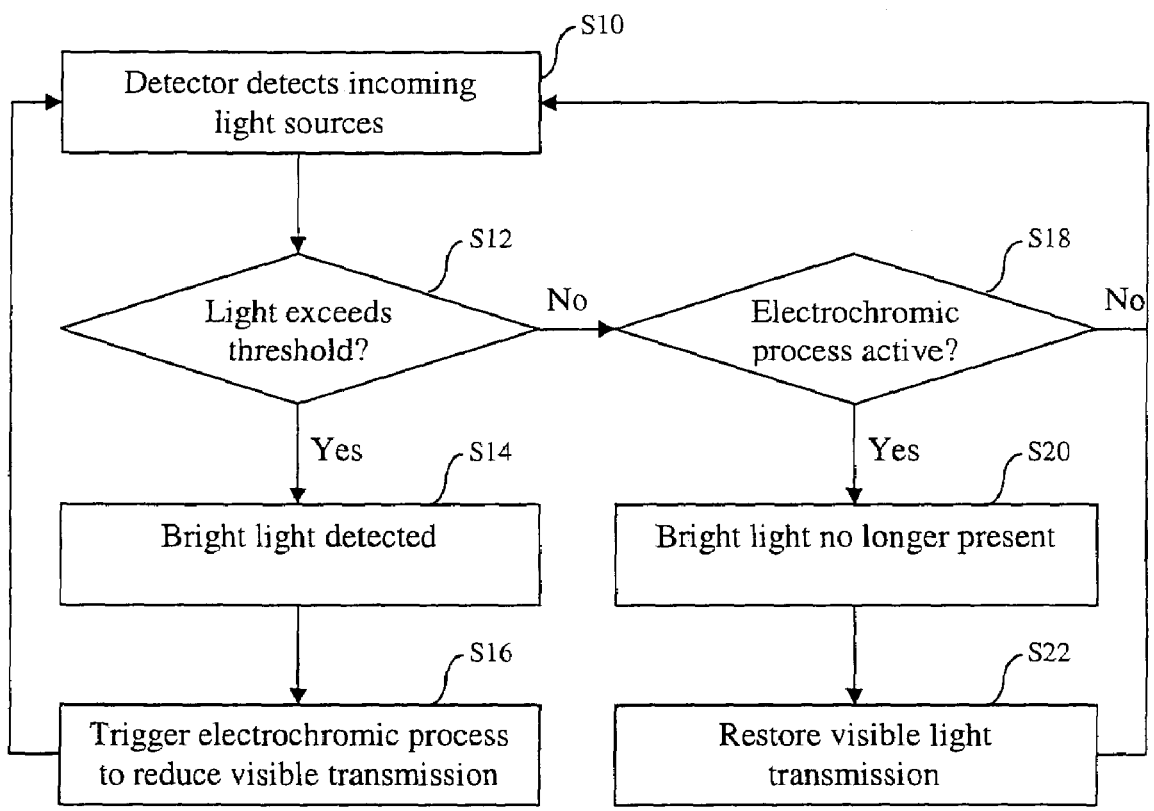
FIG. 1 is a flowchart according to a first example embodiment of the present invention.

Referring now to the drawings, FIG. 1 is a flowchart according to a first exemplary embodiment of the present invention. In Step S10, a detector detects an incoming light source. Step S12 determines whether the luminescence of the light source detected in Step S10 is greater than a given threshold. Luminescence preferably is measured in lux, though it should be noted that any standardized measure of luminescence may suffice. If the light detected is above the luminescent threshold (e.g., high beams detected), the system proceeds to Step S14. Then, in Step S16, the system triggers the electrochromic process to reduce the visible light transmission of the windshield and/or backlite, as appropriate. The electrochromic process may, for example, reduce the visible light transmission by at least 5%, 10%, 20%, or the like. Absent actuation of the visible light reduction system, the vehicle window typically has a visible light transmission rate of at least about 70 percent. After the visible light transmission has been reduced, the system returns to Step S10, where, as noted above, a detector detects incoming light sources.

If Step S12 determines that the luminescence of the light source detected in Step S10 is below the given threshold, in Step S18 the system determines whether the electrochromic process was activated and whether the visible light transmission is reduced. If the electrochromic process was not activated and the visible light transmission is not reduced (e.g., no bright light was previously detected, and the visible light transmission is at its full level), the system returns to the detecting step, Step S10. If, however, the visible light transmission reduction process (e.g., electrochromic process) was activated and the visible light transmission is reduced, Step S20 indicates that the bright light is no longer present. Thus, before returning to the detecting step S10, the system must restore the visible light transmission by deactuating the electrochromic light transmission reduction system, as shown in Step S22.

Any suitable construction for an electrochromic device may suffice. For example, see FIG. 5. Briefly, referring to FIG. 5, variable transmission electrochromic devices according to certain example embodiments of this invention may include first and second transparent, electrically conductive layers forming electrodes 16 and 18. A seal 20 is provided to secure the coated substrates together and to provide a chamber between the coated substrates in which an electrochromic medium 24 is provided. Electrically conductive clips 26 and 28 may be respectively attached to one of the coated substrates so as to be electrically coupled to one of electrode layers. The electrochromic medium 24 is contained in a chamber between the electrodes 16 and 18, and held in place by the seal. The electrochromic medium 24 is often in direct contact with transparent electrode layers 16 and 18, through which passes electromagnetic radiation whose intensity is reversibly modulated in the device by a variable voltage or potential applied to the electrode layers through the clip contacts, and a circuit.

The electrochromic medium 24 may include a cathodic and an anodic coloring species, which are colorless (or nearly colorless) in an inactivated state. In most cases, when there is no electrical potential difference between transparent electrodes, the electrochromic medium therebetween is colorless or nearly colorless, and incoming light enters through second substrate, passes through one transparent electrode, the electrochromic containing chamber 22, the other transparent electrode, and the first substrate and thus through the overall window. However, when a potential difference is applied between the transparent electrodes, the cathodic species accept electrons from the cathode, reducing the species. On the other hand, the anodic species are oxidized at the anode and therefore donate electrons to the anode 16. As the cathodic and anodic species in the electrochromic medium accept and donate electrons from/to the respective electrodes, at least one of the species becomes colored thereby reducing visible transmission of the window. The anodic and cathodic species return to a colorless or nearly colorless state once they exchange electrons. As long as a sufficient potential is applied across the electrodes, there is a sufficient amount of the anodic and cathodic species that are oxidized and reduced so as to color or reduce transmission in the electrochromic cell. The concentration of reduced cathodic species is greatest proximate to the cathode electrode 18, and the concentration of oxidized anodic species is greatest adjacent to anode electrode 16 in certain example embodiments of this invention.

Commercially available electrochromic media 24 that is suitable for use in chamber 22 generally includes, for example, solution-phase and solid state electrochromic materials. In an all solution-phase medium, the electrochemical properties of the solvent, optional inert electrolyte, anodic materials, cathodic materials, and any other components that might be present in the solution preferably are such that no significant electrochemical or other changes occur at a potential difference which oxidizes anodic material and reduces the cathodic material other than the electrochemical oxidation of the anodic material, electrochemical reduction of the cathodic material, and the self-erasing reaction between the oxidized form of the anodic material and the reduced form of the cathodic material.

Figure 5:
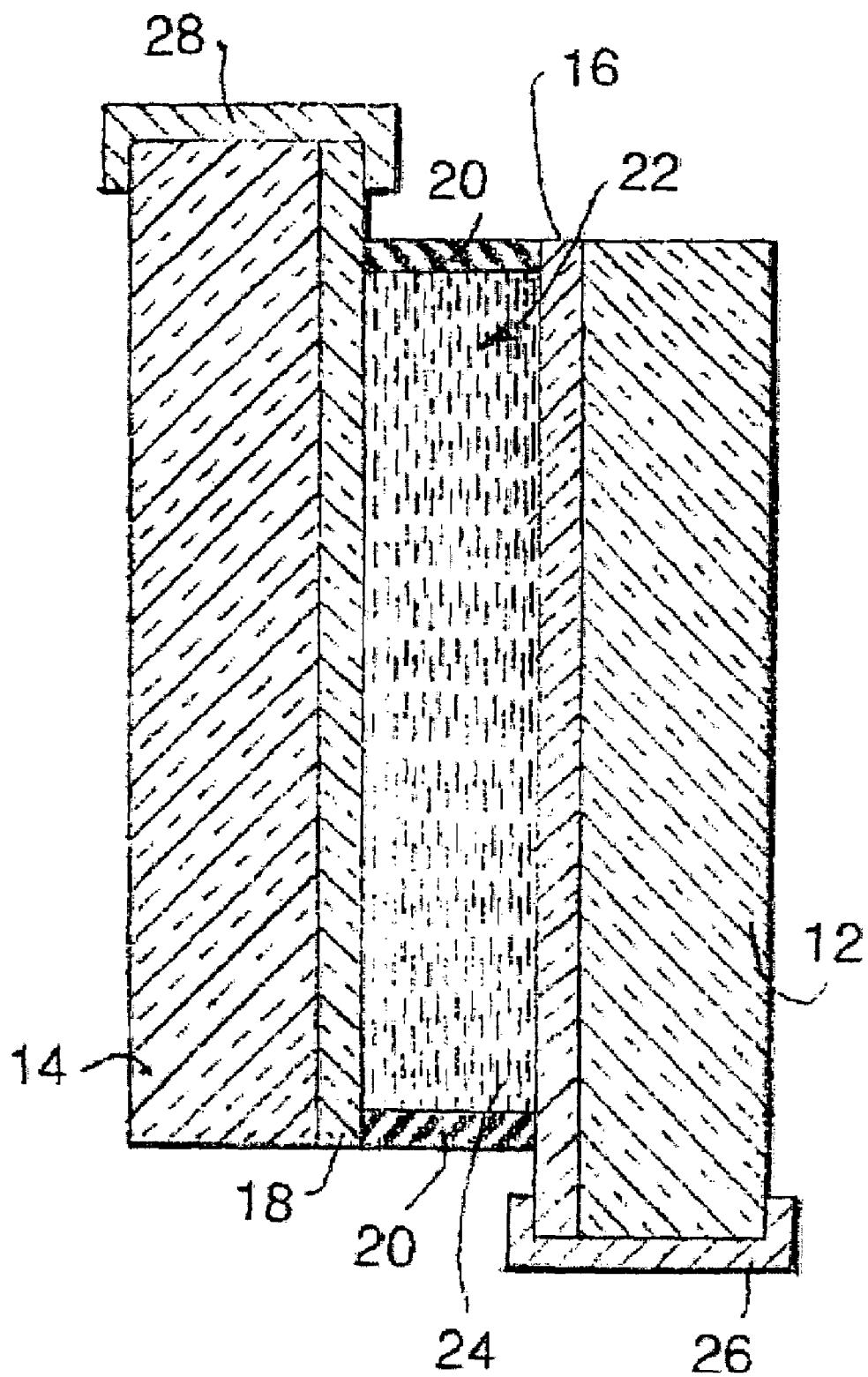
FIG. 5 is a cross sectional view of a window using an electrochromic system to reduce visible light transmission.

Still referring to FIG. 5, electrode layers 16 and 18 are connected to electronic circuitry which is effective to electrically energize the electrochromic medium 24, such that when a potential is applied across the transparent electrodes 16 and 18, electrochromic medium 24 in chamber 22 darkens, such that incident light is attenuated as the light passes through the electrochromic device. For solution-phase electrochromic systems, when the potential between the electrodes is removed or returned to zero, the device spontaneously returns to the same zero-potential, equilibrium color and transmittance as the device had before the potential was applied.

It should be noted that the above-described process is appropriate for either or both of the front windshield and the backlite. It also should be noted that the system might determine an exact or approximate amount by which the bright light exceeds the luminescent threshold and trigger a corresponding reduction in the visible light transmission via the electrochromic process.

Furthermore, it is to be appreciated that the above method constitutes a minimal set of steps, and that certain modifications are further contemplated by this invention, such as, for example, adding another detecting step after Step S16 to determine when the bright light has gone away, potentially obviating the need for Step S18; storing the state of visible light transmission (i.e. full or reduced) and referring to the stored value; etc.

Figure 2A:
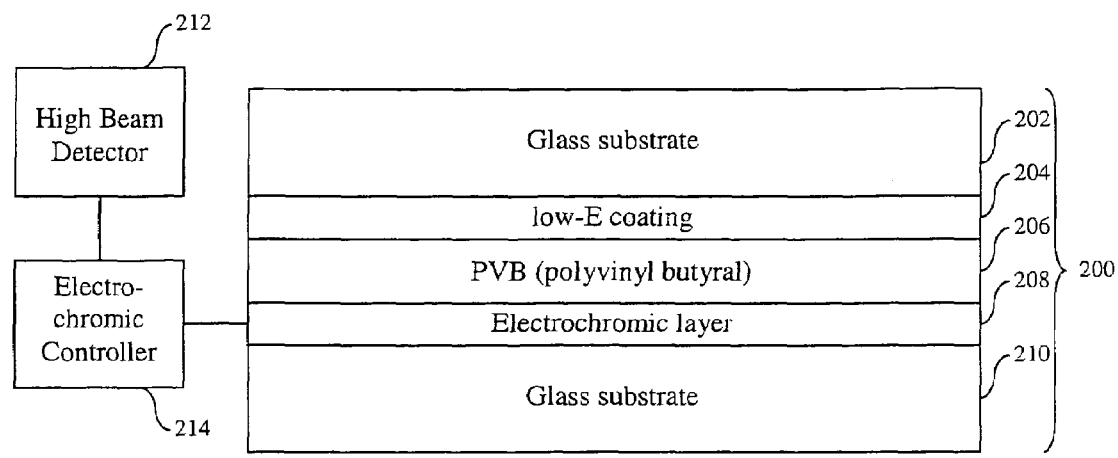
FIG. 2A is a partial schematic view of a system for reducing the visible light transmission of a front windshield according to the first example embodiment of the present invention.

FIG. 2A is a partial schematic view of a system for reducing the visible light transmission of a front windshield according to the first example embodiment of the present invention. According to this first non-limiting example embodiment, a front windshield 200 comprises a first glass substrate 202, a low-E coating 204, a PVB layer 208, and a second glass substrate 210, like typical front windshields. Windshield 200 further comprises an electrochromic layer 208. It is to be appreciated that electrochromic layer 208 could be formed anywhere in or on windshield 200 and that FIG. 2A shows only one preferable location therefor. The electrodes surrounding the electrochromic layer are not shown in FIG. 2A (or FIG. 2B) for purposes of simplicity.

This non-limiting example embodiment also includes a high beam detector 212, which detects light sources, and an electrochromic controller 214, which is connected to electrochromic layer 208. Electrochromic controller 214 determines whether the light source detected by high beam detector 212 is above the luminescent threshold and adjusts electrochromic layer 208 accordingly (i.e. decreases or increases the visible light transmission of the windshield 200).

Figure 2B:
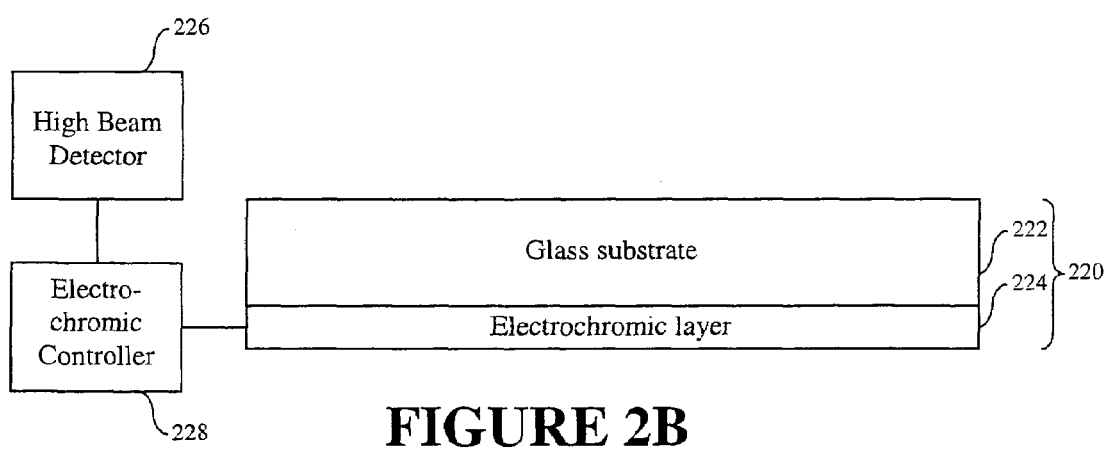
FIG. 2B is a partial schematic view of an alternative example system for reducing the visible light transmission of a backlite according to the first example embodiment of the present invention.

Similarly, FIG. 2B is a partial schematic view of a system for reducing the visible light transmission of a backlite according to the first example embodiment of the present invention. Backlite 220 is comprised of a glass substrate 222 and electrochromic layer 224. It is to be appreciated that electrochromic layer 224 could be formed anywhere in or on backlite 220, which may be comprised of additional elements or layers, and that FIG. 2B shows only one preferable location therefor. This non-limiting example embodiment also includes a high beam detector 226, which detects light sources, and an electrochromic controller 228, which is connected to electrochromic layer 224. Electrochromic controller 228 determines whether the light source detected by high beam detector 226 is above the luminescent threshold and adjusts electrochromic layer 224 accordingly (i.e. decreases or increases the visible light transmission of the backlite 220).

Second Embodiment

Figure 3:
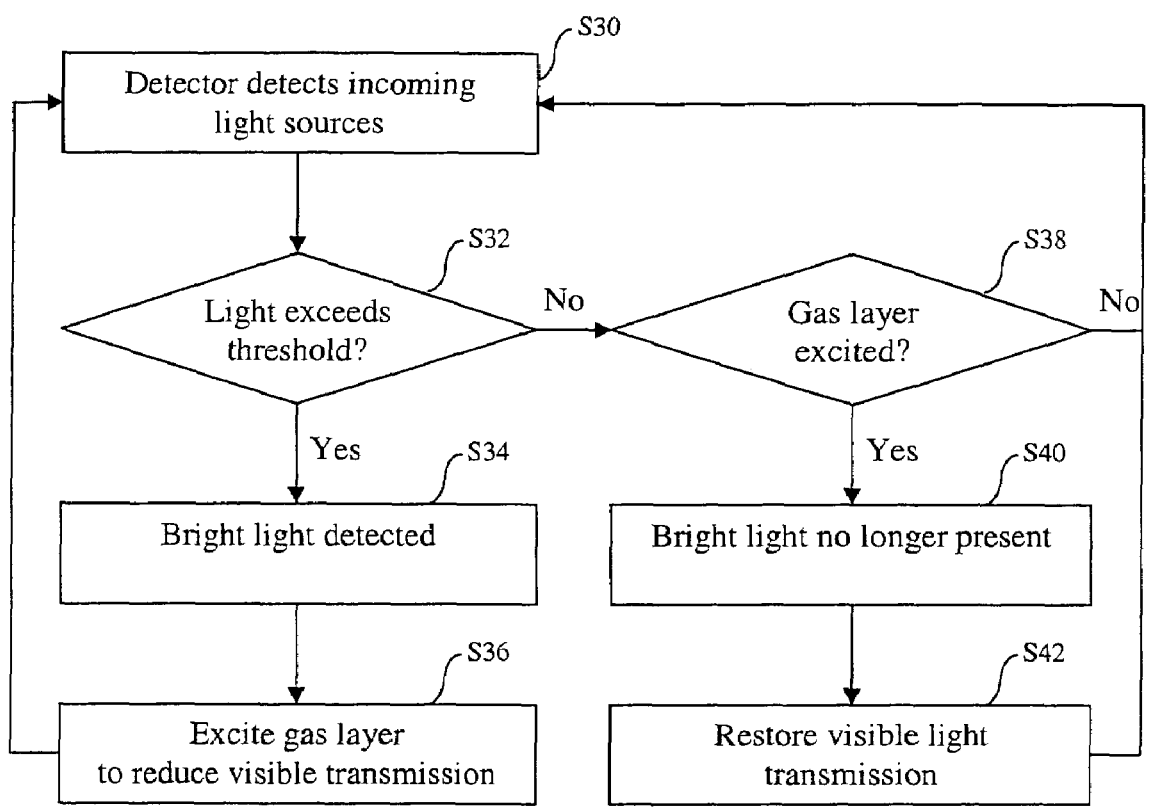
FIG. 3 is a flowchart according to a second example embodiment of the present invention.

FIG. 3 is a flowchart according to a second example embodiment of the present invention. In Step S30, a detector detects an incoming light source. Step S32 determines whether the luminescence of the light source detected in Step S30 is greater than a given threshold. If the light detected is above the luminescent threshold, the system proceeds to Step S34. Then, in Step S36, the system uses electrodes to apply a voltage across a gas-filled chamber to reduce the visible light transmission of the glass. The process of applying a voltage across the gas layer would reduce the visible light transmission by at least 10 percent. More preferably, the process of applying a voltage across the gas layer would reduce the visible light transmission by 20 percent. After the visible light transmission has been reduced, the system returns to Step S30, where, as noted above, a detector detects incoming light sources.

If Step S32 determines that the luminescence of the light source detected in Step S30 is below the given threshold, in Step S38, the system must determine whether a voltage was being applied via electrodes across the gas-filled chamber and whether the visible light transmission is reduced. If no voltage was applied across the gas-filled chamber and the visible light transmission is not reduced (i.e. no bright light was previously detected, and the visible light transmission is at its full level), the system returns to the detecting step, Step S30. If, however, voltage was applied across the gas-filled chamber and the visible light transmission is reduced, Step S40 indicates that the bright light is no longer present. Thus, before returning to the detecting step S30, the system must restore the visible light transmission, as shown in Step S42.

It should be noted that the above-described process is appropriate for either or both of the front windshield and the backlite. It also should be noted that the system might determine an exact or approximate amount by which the bright light exceeds the luminescent threshold and trigger a corresponding reduction in the visible light transmission rate via the process of using electrodes to create a voltage across a gas-filled chamber.

Figure 4A:
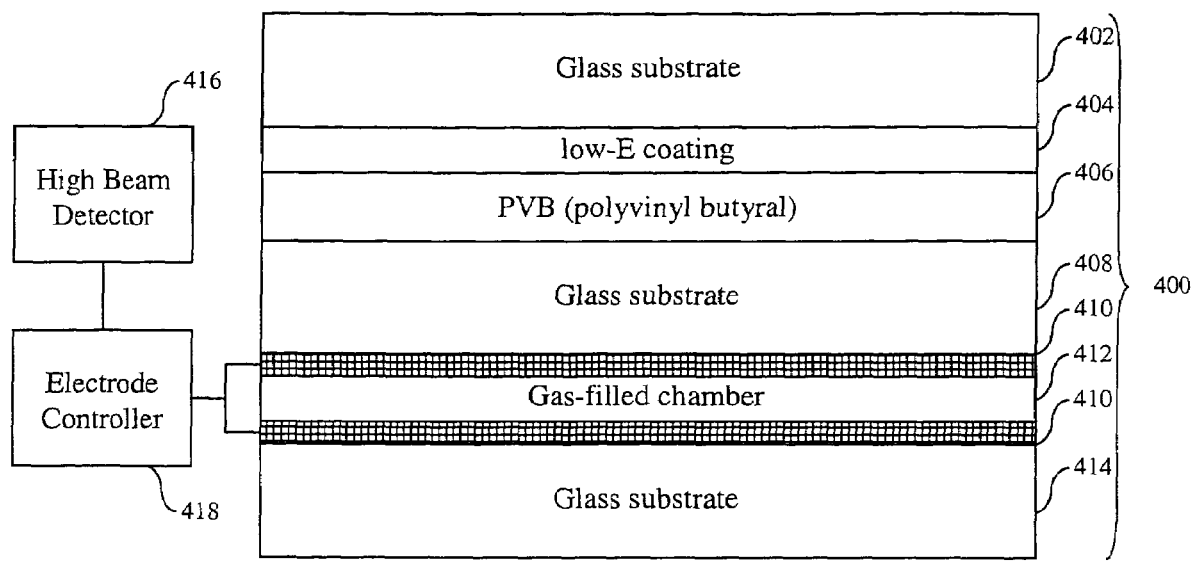
FIG. 4A is a partial schematic view of a system for reducing the visible light transmission of a front windshield according to the second example embodiment of the present invention.

FIG. 4A is a partial schematic view of a system for reducing the visible light transmission of a front windshield according to the second exemplary embodiment of the present invention. According to this second non-limiting example embodiment shown in FIG. 4A, a front windshield 400 comprises a first glass substrate 402, a low-E coating 404, a PVB layer 406, and a second glass substrate 414. Windshield 400 further comprises two electrodes 410 and a gas-filled chamber 412. It is to be appreciated that electrodes 410 and gas-filled chamber 412 could be formed anywhere in or on windshield 400 and that FIG. 4A shows only one preferable location therefor. Furthermore, it is to be appreciated that alternative electrode arrangements are possible, apart from a preferred arrangement that features parallel arrays of cathode and anode electrodes.

This illustrative embodiment also includes a high beam detector 416, which detects light sources, and an electrode controller 418, which is connected to electrodes 410. Electrode controller 418 determines whether the light source detected by high beam detector 416 is above the luminescent threshold and applies voltage via the electrodes 410 across the gas-filled chamber 412 accordingly (i.e. decreases or increases the visible light transmission of the windshield 400 by controlling the voltage applied to the electrodes in the gas-filled chamber).

Figure 4B:
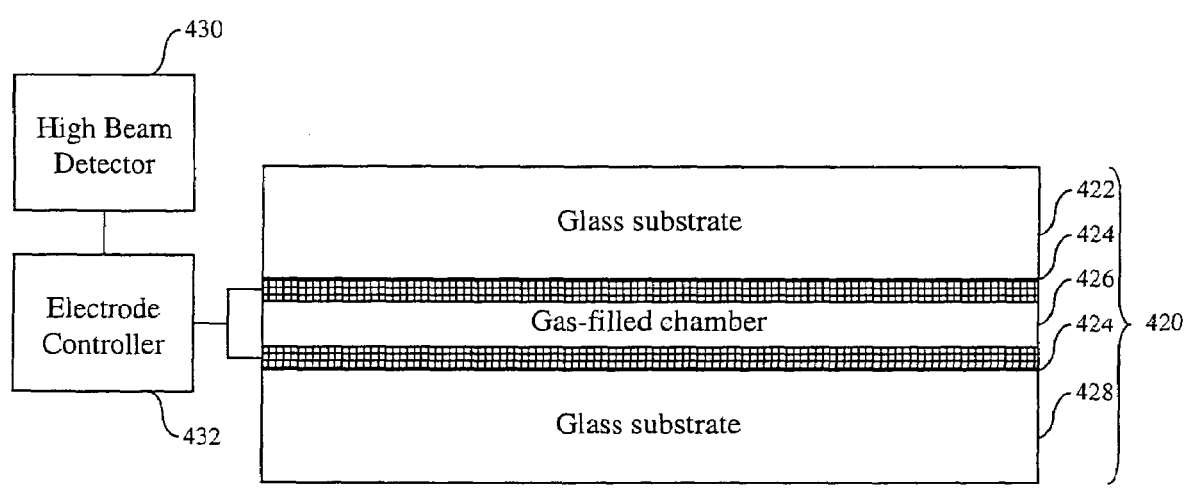
FIG. 4B is a partial schematic view of an alternative system for reducing the visible light transmission of a backlite according to the second example embodiment of the present invention.

Similarly, FIG. 4B is a partial schematic view of a system for reducing the visible light transmission of a backlite according to the second example embodiment of the present invention. Backlite 420 is comprised of a first glass substrate 422, electrodes 424, gas-filled chamber 426, and a second glass substrate 428. It is to be appreciated that electrodes 424 and gas-filled chamber 426 could be formed anywhere in or on backlite 420, which may be comprised of additional elements or layers, and that FIG. 4B shows only one preferable location therefor. Furthermore, it is to be appreciated that alternative electrode arrangements are possible. This non-limiting example embodiment also includes a high beam detector 430, which detects light sources, and an electrode controller 432, which is connected to electrodes 424. Electrode controller 432 determines whether the light source detected by high beam detector 430 is above the luminescent threshold and adjusts the gas-filled chamber accordingly (i.e. decreases or increases the visible light transmission of the backlite 420).

Additionally, one may have a sensor(s) and corresponding filter where the filter doesn't not block all visible wavelengths to the same extent. For example, the filter (any of the filtering systems or structures discussed herein, e.g., electrochromic or gas-filled, or any other suitable type) may block or attenuate certain wavelengths to a given extent, but not others. For example, an filter may be used to block or attenuate red wavelengths, but not blue and/or green wavelengths. As another example, such a selective sensor and filter(s) may cause high beam lights to appear as low beam lights through the window. In other example embodiments, the filtering may be pulsed (e.g., ever x seconds or fractions of seconds, the filtering may be implemented for a very short period of time so that the filtering behaves like a square or sine wave) so as to reduce strain on the eyes without blocking the light or alternatively while blocking the light in part as explained herein.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of adjusting the visible light transmission of a vehicle windshield upon detection of high beams, the method comprising:
   detecting a light source;
   determining whether said light source exceeds a threshold luminescence;
   reducing the visible light transmission of the windshield when said light source exceeds said threshold luminescence; and
   restoring visible light transmission of the windshield when it is detected that said light source no longer exceeds said threshold luminescence,
   wherein the visible light transmission of the windshield is no less than 70 percent before the visible light transmission is reduced.

2. The method of claim 1, wherein the visible light transmission of the windshield is reduced via an electrochromic system including an electrochromic layer sandwiched between first and second electrodes.

3. The method of claim 1, wherein the visible light transmission of the windshield is reduced by using electrodes to apply a voltage across a gas-filled chamber.

4. The method according to claim 1, wherein the visible light transmission is reduced by at least about 10 percent in said reducing step.

5. The method according to 1, wherein the visible light transmission is reduced by at least about 20 percent in said reducing step.

6. A vehicle windshield system comprising:
   first and second glass substrates;
   a polymer based interlayer provided between the first and second glass substrates;
   an electrochromic layer for adjusting the visible light transmission of said windshield;
   a detector for detecting the luminescence of a light source in front of the vehicle; and
   an electroebromic controller in electrical communication with said electrochromic layer via electrodes to actuate said electrochromic layer when it is detected that light from the light source exceeds a predetermined threshold,
   wherein the visible light transmission of the windshield is no less than 70 percent before the electrochromic layer is activated.

7. A method of adjusting the visible light transmission of a vehicle window such as a windshield or backlite upon detection of high beams, the method comprising:
   detecting a light source;
   determining whether said light source exceeds a threshold luminescence;
   using a filtering system to cause incoming high beam(s) from other vehicle(s) to appear as a low beam(s) light(s) when said light source exceeds said threshold luminescence,
   wherein the visible light transmission of the window is no less than 70 percent before the filtering system is used to cause incoming high beam(s) from other vehicle(s) to appear as a low beam(s) light(s) when said light source exceeds said threshold luminescence.

8. A method of adjusting the visible light transmission of a vehicle window such as a windshield or backlite upon detection of high beams, the method comprising:
   detecting a light source;
   determining whether said light source exceeds a threshold luminescence;
   when it is determined that the light source exceeds the threshold luminescence, implementing a pulsed filtering system so that filter of light occurs on a pulsating basis to as to periodically filter out at least portions of predetermined wavelengths of light.

* * * * *